United States Patent Office.

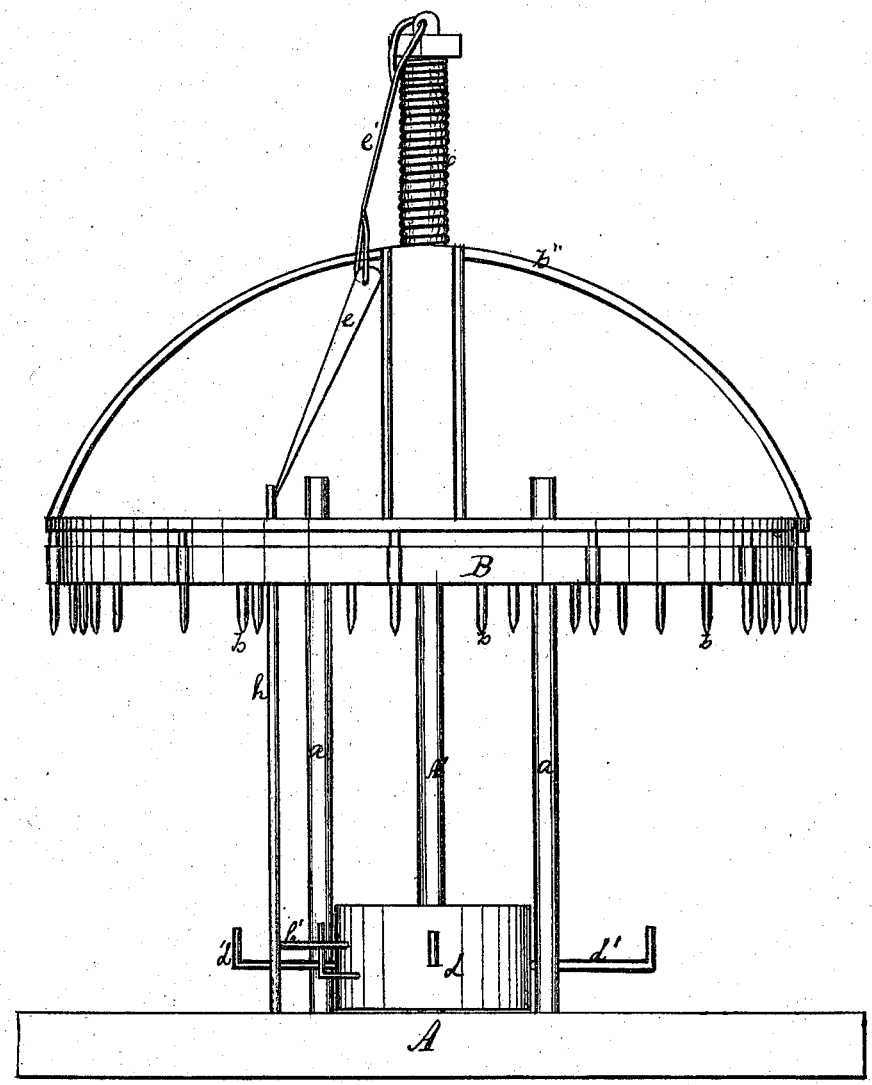

JOHN BLUME, OF MOUNT PLEASANT, MARYLAND.

Letters Patent No. 97,755, dated December 14, 1869.

IMPROVED ANIMAL-TRAP.

The Schedule referred to in these Letters Patent and making part of the same

*To all whom it may concern:*

Be it known that I, JOHN BLUME, of Mount Pleasant, in the State of Maryland, have invented a new and useful Improvement in Animal-Traps; and I do hereby declare that the following is a full, clear, and exact description of the same, reference being had to the accompanying drawings, and letters of reference marked thereon, making a part of this specification, in which—

Figure 1 is a longitudinal vertical section, and
Figure 2 is a plan view.

This invention relates to a ring armed with downwardly-projecting teeth, and provided with straight and curved cross-bars, through the centre of which a vertical rod passes, the latter being furnished with a coiled spring that presses downward on the cross-bars of the toothed ring, and with a trigger that keeps the toothed ring suspended at a suitable distance above the base-piece, the coiled spring being at the same time compressed, such trigger being so connected with the bait-holding apparatus as, when the animal pulls the bait, to be easily withdrawn from under the cross-bars of the toothed ring, and thus set the latter free to be driven down upon the animal by the compressed coil-spring.

To enable those skilled in the art to make and use my invention, I now proceed to describe its construction and operation.

Similar letters in the drawings refer to like parts.

A is the flat base, of wood or metal, or both combined.

A' is a stiff vertical rod, firmly stepped in the base.

Parallel with said rod, and at opposite sides thereof, are two other rods, *a a*, whose use is to prevent the movable portion of the trap from turning on the vertical axis.

Such movable portion consists of a ring, B, having rows of teeth *b* soldered or riveted to its lower edge. The ring may be made of sheet-metal, notched in the edge, so as to form teeth; or with two thicknesses, having corrugations for receiving the teeth; or of wood, with teeth inserted.

Diametrical cross-bars extend at right angles across the ring, and similar curved bars *b''* furnish guides for its motion.

A coiled spring, *c*, is placed around the central rod between the head of the same and the tops of the curved bars.

A cylinder, *d*, is loosely placed upon the central rod, and rests upon the base.

The cylinder is provided with a number of radial arms, *d'*, for holding the bait, which may be approached and turned by the animal from any direction.

The suspension of the toothed ring is effected by a trigger, *e*, hung by a wire, *e'*, from the head of the rod *a'*, the upper or broad end of the trigger being placed under the curved cross-bars when the latter are sufficiently elevated, and being held there by the bearing of its lower or pointed end against the upper part of a vertical rod, *h*, loosely stepped in the base-board, and connected by a horizontal arm, *h'*, with one of the bait-holding fingers.

The slightest movement of the latter by the animal causes the rod *h* to be disconnected from the trigger, whereupon the latter releases the toothed ring, which is instantly forced, by the coiled spring, down upon the animal.

This contrivance is equally well adapted for a water or land-trap, and will catch fish, as well as any animal, from a mouse to a tiger, according to its size.

When used under water, care should be taken that it present no broad surfaces, whose movement the water would resist.

What I claim as new, and desire to secure by Letters Patent, is—

The toothed ring B, provided with the cross-bars *b' b''*, and combined with the vertical posts A' *a a*, spring *c*, trigger *e*, bait-holding apparatus *d d'*, and connecting-rod *h*, in the manner and for the purpose set forth.

JOHN BLUME.

Witnesses:
ADAM BOYER,
JOEL HALL.